(12) United States Patent
Förster et al.

(10) Patent No.: US 12,509,425 B2
(45) Date of Patent: Dec. 30, 2025

(54) TABLET COMPRISING MODOFLANER AS AN ACTIVE COMPONENT

(71) Applicant: VIRBAC, Carros (FR)

(72) Inventors: Anja Förster, Duesseldorf (DE); Fabian Simons, Bonn (DE); Li Zhang, Ningbo (CN); Xiawei Jiang, Ningbo (CN); Britta Olenik, Bottrop (DE); Sylvia Dworacek, Solingen (DE)

(73) Assignee: VIRBAC, Carros (FR)

( * ) Notice: Subject to any disclaimer, the term of this patent is extended or adjusted under 35 U.S.C. 154(b) by 421 days.

(21) Appl. No.: 18/037,050

(22) PCT Filed: Nov. 16, 2021

(86) PCT No.: PCT/EP2021/081848
§ 371 (c)(1),
(2) Date: May 15, 2023

(87) PCT Pub. No.: WO2022/101502
PCT Pub. Date: May 19, 2022

(65) Prior Publication Data
US 2024/0025855 A1    Jan. 25, 2024

(30) Foreign Application Priority Data

Nov. 16, 2020  (WO) ................ PCT/CN2020/129060

(51) Int. Cl.
*C07D 213/82* (2006.01)
*A61K 9/20* (2006.01)
*A61K 31/455* (2006.01)

(52) U.S. Cl.
CPC .......... *C07D 213/82* (2013.01); *A61K 9/2009* (2013.01); *A61K 9/2013* (2013.01); *A61K 9/2027* (2013.01); *A61K 9/2054* (2013.01); *A61K 9/2068* (2013.01); *A61K 31/455* (2013.01); *C07B 2200/13* (2013.01)

(58) Field of Classification Search
None
See application file for complete search history.

(56) References Cited

U.S. PATENT DOCUMENTS 8,168,825 B2    5/2012  Yoshida et al.

FOREIGN PATENT DOCUMENTS

| CA | 2 786 802 A1 | 8/2011 |
|---|---|---|
| EP | 2 319 830 A1 | 5/2011 |
| WO | WO 2005/073165 A1 | 8/2005 |
| WO | WO 2010/018714 A1 | 2/2010 |
| WO | WO 2011/093415 A1 | 8/2011 |
| WO | WO 2019/059412 A1 | 3/2019 |

OTHER PUBLICATIONS

International Search Report and Written Opinion for corresponding PCT Application No. PCT/EP2021/081848, mailed Apr. 14, 2022 (15 pages).

*Primary Examiner* — Trevor Love
*Assistant Examiner* — Paul Hoerner
(74) *Attorney, Agent, or Firm* — Womble Bond Dickinson (US) LLP

(57) ABSTRACT

The present invention relates to a crystalline modification of Modoflaner 6-fluoro-N-(3-(2-iodo-4-(perfluoropropan-2-yl)-6-(trifluoromethyl)phenylcarbamoyl)-2-fluorophenyl) nicotinamide of formula (I):

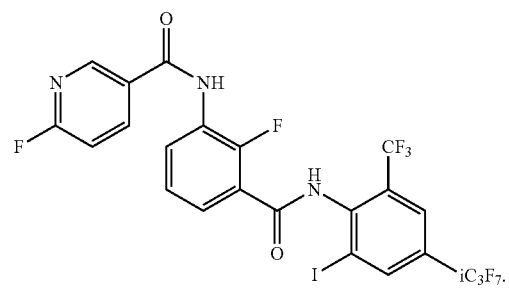

17 Claims, 2 Drawing Sheets

TABLET COMPRISING MODOFLANER AS AN ACTIVE COMPONENT

CROSS-REFERENCE TO RELATED APPLICATIONS

This application is a National Phase Patent Application and claims priority to and the benefit of International Patent Application No. PCT/EP2021/081848, filed on Nov. 16, 2021, which claims priority to and the benefit of International Patent Application No. PCT/CN2020/129060, filed on Nov. 16, 2020. The entire contents of both of which are incorporated herein by reference.

The present invention relates to crystalline form IV of 6-fluoro-N-(3-(2-iodo-4-(perfluoropropan-2-yl)-6-(trifluoromethyl)phenylcarbamoyl)-2-fluorophenyl)-nicotinamide (Modoflaner), a tablet comprising Modoflaner, preferably in said crystalline modification, a process for preparing said tablet and said tablet for the use in the treatment and/or prophylaxis of parasitic infestations of animals.

TECHNICAL BACKGROUND

Arylaminobenzam ides are known from WO2005/073165, WO2010/018714, WO2011/093415 or WO2019/059412 as active components for insecticides in crop protection.

It has been found in this invention that a certain compound of these arylaminobenzamides is also suitable as active component in the treatment and/or prophylaxis of parasitic infestations of animals, preferably parasitic infestations of dogs, most preferably parasitic infestations of dogs by ectoparasites.

For said use, it is preferable to put the active component into a form, which is accepted by the animal in oral form, such as a tablet.

Due to its hydrophobicity, Modoflaner shows a low solubility and wettability in aqueous media so that granulation of this active component to form tablets has turned out to be challenging.

In addition, the hydrophobicity of Modoflaner also limits its oral bioavailability. It has been found that Modoflaner shows polymorphism and can be crystallized in at least 4 different crystalline modifications and at least 3 different pseudopolymorphic forms.

Among these forms, it has in particular been found that crystalline modification IV of Modoflaner, although not the most stable, displays favorable properties with respect to wettability and bioavailability upon oral administration.

It has been further found that this metastable form can be incorporated and maintained into tablets having the formulation described herein.

In the present invention a tablet is provided comprising as active component Modoflaner, preferably crystalline modification IV of Modoflaner.

Further, a process for producing said tablet is provided in which the above discussed challenges are taken into account and the active component is evenly distributed in the tablet.

Said tablet has been found to be suitable as active component in the treatment and/or prophylaxis of parasitic infestations of animals, preferably parasitic infestations of carnivores such as dogs, most preferably parasitic infestations of carnivores such as dogs by ectoparasites.

SUMMARY OF THE INVENTION

Unless otherwise stated, all % wt are based on the total weight amount of the dosage form or tablet.

In a first embodiment, the present invention relates to crystalline modification IV of Modoflaner ((6-fluoro-N-(3-(2-iodo-4-(perfluoropropan-2-yl)-6-(trifluoromethyl)phenylcarbamoyl)-2-fluoro-phenyl)-nicotinamide).

In a second embodiment, the present invention relates to a solid oral dosage form, such as a soft chew or a tablet comprising crystalline modification IV of Modoflaner and a water absorption agent, in particular in amounts from 0.1 wt % to 5.0 wt %, preferably wt % to 3.0 wt %, most preferably 0.7 wt % to 2.0 wt %.

The present invention also relates to a tablet comprising Modoflaner, preferably crystalline modification IV of Modoflaner, and a water absorption agent, in particular in amounts from 0.1 wt % to 5.0 wt %, preferably 0.5 wt % to 3.0 wt %, most preferably 0.7 wt % to 2.0 wt %, and a binding agent in amounts of from 0.5 wt % to 10.0 wt %, preferably 1.0 to 8.0 wt %, most preferably 3.0 to 5.5 wt %, said tablet having a residual moisture of from 0.5 to 10.0%, preferably from 0.7 to 7.5% and most preferably from 1.0 to 5.0%, these amounts each based on the total weight amount of the tablet.

Further, the present invention relates to a process for producing a solid oral dosage form, in particular a tablet.

Still further, the present invention relates to the tablet as defined above or below for use in the treatment and/or prophylaxis of parasitic infestations of animals, preferably parasitic infestations of pets such as dogs, cats and ferrets, and useful animals, most preferably parasitic infestations of pets such as dogs, cats and ferrets, and useful animals by ectoparasites.

DETAILED DESCRIPTION OF THE INVENTION

In a first embodiment, the present invention relates to crystalline modification IV of Modoflaner (6-fluoro-N-(3-(2-iodo-4-(perfluoropropan-2-yl)-6-(trifluoromethyl)phenylcarbamoyl)-2-fluoro-phenyl)-nicotinamide).

The terms "crystal form" and "crystalline form" can be used interchangeably to denote polymorphs and pseudopolymorphs of a crystalline solid.

The terms "polymorph" and "modification" can be used synonymously to denote one particular crystal structure in which a compound can crystallize. Different polymorphs have different arrangements or conformations of the molecules in the crystal lattice but all share the same elemental composition.

Throughout the specification, the term "modification" or "crystalline modification" is generally used as a synonym for the term "form", "crystal form" or "crystalline form". The term "polymorphism" denotes the ability of a compound to form more than one polymorph.

By "crystalline modification IV of Modoflaner" is thus in particular meant crystalline form IV of Modoflaner, more particularly crystalline polymorphic form IV of Modoflaner.

The term "XRPD" denotes the analytical method of X-Ray Powder Diffraction.

Modoflaner has the following formula (I):

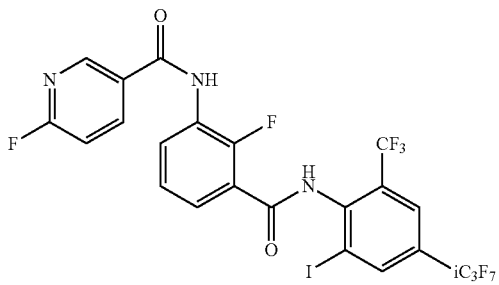

Modoflaner can be prepared for example following the procedure described in WO2019/059412.

Crystalline modification IV of Modoflaner is an anhydrate and is characterized by displaying at least the following reflections: 11.6°, 11.8°, 16.0° and 20.7°, quoted as 2θ value±0.2° in an X-ray powder diffractogram at 25° C. and Cu-Kα 1 radiation using a single-crystal diffractometer.

By "displaying at least the following reflections in an X-ray powder diffractogram" is in particular meant an XRPD pattern comprising at least the following peaks, more particularly the following characteristic peaks.

In the present invention, the X-ray powder diffractogram at 25° C. and Cu-Kα 1 radiation was obtained using a single-crystal diffractometer Oxford Diffraction Gemini R Ultra with the following parameters:

Anode: Cu
K-Alpha1 [Å]: 1.54060
Generator: 40 mA, 40 kV
Sample rotation: Yes
Scan axis: Gonio
Starting Position [°2Th.]: 2.0066
End Position [°2Th.]: 37.9906

The repeatability of the angular values is in the range of 2Theta±0.2°. The term "approximately" given in combination with an angular value denotes the repeatability which is in the range of 2Theta±0.2°.

According to a further embodiment, crystalline modification IV of Modoflaner according to the present invention displays at least five, in particular at least seven, more particularly at least ten, and especially all of the reflections quoted in Table 1 (at 25° C. and Cu-Kα1 radiation, quoted as 2θ value±0.2°.

TABLE 1

X-ray reflections of the crystalline
modification IV of the compound of formula (I)
Reflections (Peak maxima) [°2 Theta]

4.1
5.7
5.8
8.1
8.9
11.4
11.6
11.8
12.3
12.6
12.9
13.4
14.1
14.3
14.5
15.5

TABLE 1-continued

X-ray reflections of the crystalline
modification IV of the compound of formula (I)
Reflections (Peak maxima) [°2 Theta]

16.0
16.3
17.2
17.5
19.1
19.4
19.6
19.9
20.0
20.4
20.7
21.4
21.6
21.9
22.0
22.6
23.3
23.9
24.1
24.4
24.9
25.1
25.3
25.5
25.9
26.3
26.9
27.5
27.5
28.1
28.7
29.0
29.3
29.9
30.2
30.4
30.5
30.9
31.2
31.8
32.3
32.7
33.4
34.1
35.3
36.6
38.1
39.4

According to a further embodiment, crystalline modification IV of Modoflaner according to the present invention displays at least five, in particular at least seven, more particularly all of the reflections quoted in Table 2 (at 25° C. and Cu-Kα1 radiation, quoted as 2θ value±0.2°.

TABLE 2

Most intensive X-ray reflections of the crystalline
modification IV of the compound of formula (I):
Most intensive Reflections (Peak maxima)
Modification IV 11.6
11.8
16.0
20.7
14.3
12.6
14.1
19.6
20.7
30.4

Crystalline modification IV of the compound of Modoflaner can further be characterized by the X-ray powder diffractogram depicted in FIG. 1.

Crystalline modification IV of Modoflaner can be further characterized by differential scanning calorimetry (DSC) and optionally thermogravimetric analysis (TGA).

In DSC, crystalline modification IV of Modoflaner displays an endothermic event at 184° C. with an enthalpy of fusion of 56 $Jg^{-1}$ and an additional endothermic event at about 211° C. ($\Delta H=10$ $Jg^{-1}$). This second event is very broad with various maxima.

In the present invention, differential scanning calorimetry (DSC) and thermogravimetric analysis (TGA) were performed on a Mettler thermal analysis system DSC 823/700 and DSC 3/700 (Temperature range: −10–250° C. (standard) Heating rate: 10 $Kmin^{-1}$, 20 $Kmin^{-1}$, 2 $Kmin^{-1}$, Purge gas: dry nitrogen and a Mettler thermal analysis system TGA/DSC3+/LF 1600° C. (Temperature range: 25-300° C. Heating rate: 10 $Kmin^{-1}$, Purge gas: dry nitrogen).

Crystalline modification IV of Modoflaner can be prepared by recrystallization from ethyl acetate solution at ambient conditions, under cooling conditions or via precipitation with water.

In a second embodiment, the present invention relates to a solid oral dosage form, such as a tablet or a soft chew, comprising Modoflaner, in particular crystalline modification IV of Modoflaner and a water absorption agent.

It has been found that a water absorption agent in the solid oral dosage form avoids the conversion of crystalline modification IV into less desirable crystalline modification of Modoflaner, which in turn helps to maintain favorable pharmacokinetic properties, more specifically a high bioavailability. The amount of the water absorption agent may vary depending on the type of formulation but typical amounts of the water absorption agent are from 0.1 wt % to 5.0 wt %, preferably 0.5 wt % to 3.0 wt %, most preferably 0.7 wt % to 2.0 wt %, based on the total weight amount of the solid oral dosage form.

It has been found particularly useful to prepare granules comprising Modoflaner, preferably crystalline modification IV of Modoflaner, and the water absorption agent. Thereby, good processability of the solid oral dosage form mixture and stability of Modoflaner, preferably crystalline modification IV of Modoflaner are guaranteed.

The present invention relates more particularly to a tablet comprising:
Modoflaner, preferably crystalline modification IV of Modoflaner,
0.1 wt % to 5.0 wt %, preferably 0.5 wt % to 3.0 wt %, most preferably 0.7 wt % to 2.0 wt % of a water absorption agent, and
0.5 wt % to 10.0 wt %, preferably 1.0 to 8.0 wt %, most preferably 3.0 to 5.5 wt % of a binding agent,
wherein the tablet has a residual moisture of from 0.5 to 10.0%, preferably from 0.7 to 7.5% and most preferably from 1.0 to 5.0%, these amounts each based on the total weight amount of the tablet.

In the tablets according to the present invention, it is preferred that at least 90.0 wt % and more preferably at least 98.0 wt % of Modoflaner is in the form of crystalline modification IV, based on the total weight of Modoflaner.

Modoflaner, preferably crystalline modification IV of Modoflaner, is present in the tablet in an amount of from 20.0 wt % to 60.0 wt %, preferably 25.0 to 50.0 wt %, more preferably from 30.0 wt % to 40.0 wt %, based on the total weight amount of the tablet.

The tablet further includes 0.1 wt % to 5.0 wt %, preferably 0.5 wt % to 3.0 wt % and most preferably 0.7 wt % to 2.0 wt % of a water absorption agent.

The water absorption agent is preferably selected from silicon dioxide, such as colloidal silicon dioxide, lactose, starch and starch derivatives such as modified starch, bentonite or mixtures thereof, preferably silicon dioxide and most preferably colloidal silicon dioxide.

Additionally, the tablet includes 0.5 wt % to 10.0 wt %, 1.0 to 8.0 wt % most preferably 3.0 to 5.5 wt % of a binding agent.

The binding agent is preferably selected from polyvinylpyrrolidone, polyvinylpyrrolidone derivatives, cellulose derivatives, such as methylcellulose, hydroxypropylcellulose or hydroxypropylmethylcellulose, or starch derivatives, such as modified starch, or mixtures thereof, preferably polyvinylpyrrolidone or hydroxypropylcellulose.

By adding a water absorption agent, uniform distribution of aqueous media in the granules is obtained. The residual moisture is maintained in a range of from 0.5 to 10.0%, preferably from 0.7 to 7.5% and most preferably from 1.0 to 5.0%. Thereby, good processability of the tablet mixture and stability of Modoflaner, preferably crystalline modification IV of Modoflaner, are guaranteed.

The tablet can comprise further components, such as fillers, additives and flavoring agents.

Preferably, the tablet comprises 20.0 to 50.0 wt %, preferably 25.0 to 45.0 wt %, most preferably 27.0 wt % to 40.0 wt % of a filler.

The filler can be any filler suitable for tablets to be used in the veterinary field and is preferably selected from cellulose or derivatives, starch, sugars such as sucrose, glucose or lactose and derivatives such as modified or water-free lactose, sugar alcohols such as mannitol or sorbitol, inorganic fillers such as calcium carbonate, dicalcium phosphate or magnesium carbonate, or mixtures thereof, preferably cellulose, starch or lactose or mixtures thereof most preferably cellulose or a mixture of starch and lactose.

It is further preferred that the tablet comprises from 1.0 to 25.0 wt %, preferably 5.0 to 22.5 wt %, most preferably 10.0 wt % to 20.0 wt % of additives.

The additives can be any additives suitable for tablets to be used in the veterinary field and are preferably selected from wetting agents, lubricants and glidants, disintegrants or mixtures thereof.

Suitable wetting agents can be selected from ionic or non-ionic surfactants and emulsifiers such as sodium docecylsulfate, sodium laureth sulfate, polysorbates such as polysorbate 20, polysorbate 60, polysorbate 80, sorbitan monostearate, polyalkylene glycolether, polyethylene glycol stearate, poloxamers or mixtures thereof.

Lubricants can be selected from magnesium stearate, calcium behenate, glycerol monostearate, stearic acid, hydrated plant fats, talc or mixtures thereof. Glidants can be selected from silica species such as colloidal silicon dioxide.

Disintegrants can be selected from carboxymethyl cellulose (carmellose), cross-linked carboxymethyl cellulose (croscarmellose) such as cross-linked sodium carboxymethyl cellulose, starch and starch derivatives such as pregelatinized starch, alginic acid, polyvinylpolypyrrolidone, sodium hydrogen carbonate or mixtures thereof.

Usually the tablet further comprises from 5.0 wt % to 20.0 wt %, preferably 6.0 to 17.5 wt %, most preferably 8.0 wt % to 15.0 wt % of a flavoring agent.

The flavoring agent is preferably selected from meat flavoring. Meat flavoring refers to an additive which is of synthetic or animal origin or a mixture of the two and imparts a meat-like odor and/or taste to the tablets. Preferably, meat flavorings purely of animal origin are used. These are, for example, prepared from beef, poultry, fish, animal skins or animal livers. Preference is given to so-called desiccated liver powders, for example from cattle, sheep, poultry or pig and particularly preferably from poultry or pig.

Optionally, it is additionally possible to use flavor enhancers such as, for example, yeast, yeast extracts or glutamate in customary amounts, for example in concentrations of from 1 to 30% by weight, preferably from 1 to 20% by weight of the weight amount of the flavoring agent.

In a preferred embodiment the tablet comprises, preferably consists of, based on the total weight amount of the tablet:
  from 20.0 wt % to 60.0 wt %, more preferably 25.0 to 50.0 wt %, most preferably from 30.0 wt % to 40.0 wt % of Modoflaner, preferably crystalline modification IV of Modoflaner,
  0.1 wt % to 5.0 wt %, preferably 0.5 wt % to 3.0 wt %, most preferably 0.7 wt % to 2.0 wt % of a water absorption agent, preferably selected from silicon dioxide, such as colloidal silicon dioxide, lactose, starch and starch derivatives, bentonite or mixtures thereof, preferably silicon dioxide and most preferably colloidal silicon dioxide;
  0.5 wt % to 10.0 wt %, preferably 1.0 to 8.0 wt %, most preferably 3.0 to 5.5 wt % of a binding agent, preferably selected from polyvinylpyrrolidone, polyvinylpyrrolidone derivatives, cellulose derivatives, such as methylcellulose, hydroxypropylcellulose or hydroxypropylmethylcellulose, or starch derivatives, such as smodified starch, or mixtures thereof, preferably polyvinylpyrrolidone or hydroxypropylcellulose;
  20.0 to 50.0 wt %, preferably 25.0 to 45.0 wt %, most preferably 27.0 wt % to 40.0 wt % of a filler, preferably selected from cellulose or derivatives, starch, sugars such as sucrose, glucose or lactose, sugar alcohols such as mannitol or sorbitol, inorganic fillers such as calcium carbonate, dicalciumphosphate or magnesium carbonate, or mixtures thereof, preferably cellulose, starch or lactose or mixtures thereof most preferably cellulose or a mixture of starch and lactose;
  5.0 wt % to 20.0 wt %, preferably 6.0 to 17.5 wt %, most preferably 8.0 wt % to 15.0 wt % of a flavoring agent, preferably selected from meat flavoring and optionally flavor enhancers;
  1.0 to 25.0 wt %, preferably 5.0 to 22.5 wt %, most preferably 10.0 wt % to 20.0 wt % of additives, preferably selected from wetting agents, lubricants and glidants, disintegrants or mixtures thereof;

The tablet can have any suitable form for being administered orally to animals, preferably carnivores, such as dogs, cats or ferrets, most preferably dogs, such as a round form, oblong form or bone-shaped form.

The tablet preferably has a length or diameter of from 0.5 to 10 cm, preferably from 0.7 to 5 cm in all dimensions.

In a further aspect, the present invention relates to the tablet as defined above or below for the use in the treatment and/or prophylaxis of parasitic infestations of animals, preferably parasitic infestations of pets such as dogs, cats and ferrets, most preferably parasitic infestations of pets such as dogs, cats and ferrets, by ectoparasites.

The parasitic infestations can be caused by ectoparasites or endoparasites.

Ectoparasites include insects, such as fleas, as well as acari, such as ticks and mites.

Ectoparasites can be:
from the order of the Anoplura, for example, *Haematopinus* spp., *Linognathus* spp., *Solenopotes* spp., *Pediculus* spp., *Pthirus* spp.; from the order of the Mallophaga, for example, *Trimenopon* spp., *Menopon* spp., *Eomenacanthus* spp., *Menacanthus* spp., *Trichodectes* spp., *Felicola* spp., *Damalinea* spp., *Bovicola* spp;
from the order of the Diptera, suborder Brachycera, for example, *Chrysops* spp., *Tabanus* spp., *Musca* spp., *Hydrotaea* spp., *Muscina* spp., *Haematobosca* spp., *Haematobia* spp., *Stomoxys* spp., *Fannia* spp., *Glossina* spp., *Lucilia* spp., *Calliphora* spp., *Auchmeromyia* spp., *Cordylobia* spp., *Cochliomyia* spp., *Chrysomyia* spp., *Sarcophaga* spp., *Wohlfartia* spp., *Gasterophilus* spp., *Oesteromyia* spp., *Oedemagena* spp., *Hypoderma* spp., *Oestrus* spp., *Rhinoestrus* spp., *Melophagus* spp., *Hippobosca* spp.
from the order of the Diptera, suborder Nematocera, for example, *Culex* spp., *Aedes* spp., *Anopheles* spp., *Culicoides* spp., *Phlebotomus* spp., *Simulium* spp.
from the order of the Siphonaptera, for example, *Ctenocephalides* spp., *Echidnophaga* spp., *Ceratophyllus* spp., *Pulex* spp.
from the order of the Metastigmata, for example, *Hyalomma* spp., *Rhipicephalus* spp., *Boophilus* spp., *Amblyomma* spp., *Haemaphysalis* spp., *Dermacentor* spp., *Ixodes* spp., *Argas* spp., *Ornithodorus* spp., *Otobius* spp.;
from the order of the Mesostigmata, for example, Dermanyssus spp., *Ornithonyssus* spp., *Pneumonyssus* spp.
from the order of the Prostigmata, for example, *Cheyletiella* spp., *Psorergates* spp., *Myobia* spp., *Demodex* spp., *Neotrombicula* spp.;
from the order of the Astigmata, for example, *Acarus* spp., *Myocoptes* spp., *Psoroptes* spp., *Chorioptes* spp., *Otodectes* spp., *Sarcoptes* spp., *Notoedres* spp., *Knemidocoptes* spp., *Neoknemidocoptes* spp., *Cytodites* spp., *Laminosioptes* spp.

Particular emphasis may be given to the action against fleas (Siphonaptera, for example, *Ctenocephalides* spp., *Echidnophaga* spp., *Ceratophyllus* spp., *Pulex* spp.), ticks (*Hyalomma* spp., *Rhipicephalus* spp., *Boophilus* spp., *Amblyomma* spp., *Haemaphysalis* spp., *Dermacentor* spp., *Ixodes* spp., *Argas* spp., *Ornithodorus* spp., *Otobius* spp.) and the Diptera mentioned above (*Chrysops* spp., *Tabanus* spp., *Musca* spp., *Hydrotaea* spp., *Muscina* spp., *Haematobosca* spp., *Haematobia* spp., *Stomoxys* spp., *Fannia* spp., *Glossina* spp., *Lucilia* spp., *Calliphora* spp., *Auchmeromyia* spp., *Cordylobia* spp., *Cochliomyia* spp., *Chrysomyia* spp., *Sarcophaga* spp., *Wohlfartia* spp., *Gasterophilus* spp., *Oesteromyia* spp., *Oedemagena* spp., *Hypoderma* spp., *Oestrus* spp., *Rhinoestrus* spp., *Melophagus* spp., *Hippobosca* spp.).

Preferably ectoparasites include:
*Ctenocephalides felis, Ixodes scapularis, Ixodes ricinus, Dermacentor variabilis, Dermacentor reticulatus, Rhipicephalus sanguineus, Amblyomma americanum, Ixodes holocyclus, Ixodes hexagonus, Haemaphysalis longicornis, Otodectes cynotis, Sarcoptes scabiei, Demodex canis,*
More preferably ectoparasites include:
*Ctenocephalides felis, Ixodes scapularis, Ixodes ricinus, Dermacentor variabilis, Dermacentor reticulatus, Rhipicephalus sanguineus, Amblyomma americanum Ixodes holocyclus, Ixodes hexagonus.*

The tablet is especially suitable for the treatment of dogs.

In a further aspect, the present invention relates to a process for producing a tablet as defined above or below comprising the steps of:
  a) mixing Modoflaner, preferably crystalline modification IV of Modoflaner, at least part of the amount of the water absorption agent and at least part of the amount of the binding agent in a mixer,
  b) granulating the mixture of step a),
  c) mixing the granules of step b) with other optional components and optionally part of the amount of the water absorption agent,
  d) pressing the mixed granules of step c) into a tablet,
wherein the tablet has a residual moisture of from 0.5 to 10.0%, preferably from 0.7 to 7.5% and most preferably from 1.0 to 5.0%, based on the total weight amount of the tablet.

It is preferred that the filler and at least part of the amount of additives is added to the mixing step a).

It is further preferred that the flavoring agent and part of the amount of additives is added to the mixing step c).

Thereby, the active component, the water absorption agent, the binding agent, and the other optional components, such as the flavoring agent, the filler and the additives are preferably as defined herein above or below.

The mixture is preferably granulated in step b) in the mixer.

Thereby, it is preferred that the mixer is operated at high shear rates. The rotation speed is dependent on the selected equipment. It is preferably in the range of from 25-200 rpm.

It has been found that by carefully selecting the components of the tablet, the process can be optimized and Modoflaner, preferably crystalline modification IV of Modoflaner, can be evenly distributed in the tablet. Further, it has been found that the process according to the invention enables to maintain the crystalline form (IV) of Modoflaner during the process and during storage of the tablets. As a result, the bioavailability of Modoflaner, preferably crystalline modification IV of Modoflaner, is not compromised and remains high even after prolonged storage of the tablets.

EXAMPLES

Figure 1:
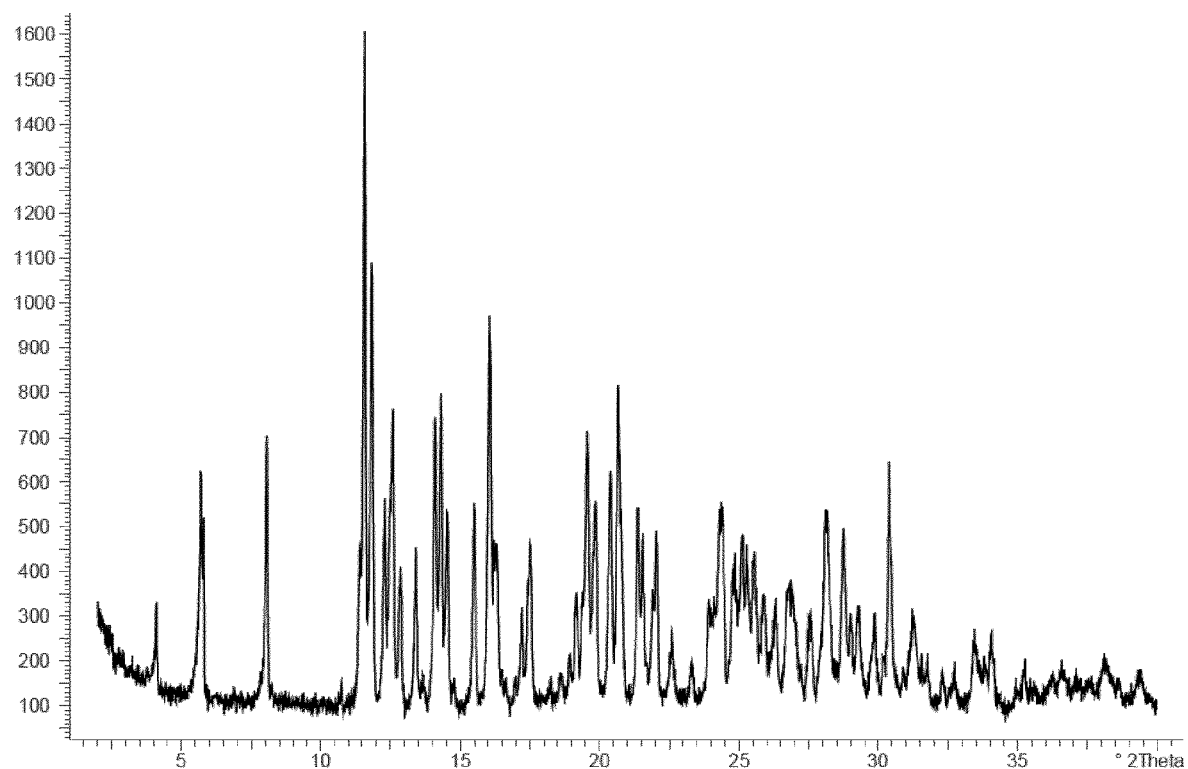
FIG. 1 shows the the X-ray powder diffractogram at 25° C. and Cu-Kα 1 radiation obtained using a single-crystal diffractometer Oxford Diffraction Gemini R Ultra with the following parameters: Anode: Cu; K-Alpha1 [Å]: 1.54060; Generator: 40 mA, 40 kV; Sample rotation: Yes; Scan axis: Gonio; Starting Position [°2Th.]: 2.0066; End Position [°2Th.]: 37.9906.

Example 1: Preparation of Crystalline Modification IV of Modoflaner 3.5 volumes of acetone were charged into a reactor under nitrogen. 1 equivalent of Modoflaner (98% purity) was charged into the reactor and the charging port was rinsed with an additional 0.5 volume of acetone.

The temperature was adjusted to 55° C. and the mixture was stirred until complete dissolution of the solid. The temperature was adjusted to 45° C. over one hour and 0.2% (w/w) of crystalline modification IV of Modoflaner (obtained by recrystallization from ethyl acetate solution at ambient conditions) was added and the mixture stirred during at least 30 minutes at this temperature. The temperature was set to 35° C. and 5 volumes of n-heptane were added dropwise over at least 2 hours. The mixture was maintained at a temperature below 40° C. and concentrated to 6 volumes. The mixture was gradually cooled down to 10° C. and allowed to stir at that temperature for at least 2 hours.

The mixture was pressure filtered through a 0.22 μm microporous filter and the filter cake rinsed with 1 volume of n-heptane to afford after drying at up to 55° C. crystalline modification IV of Modoflaner (Yield between 60 to 100%).

Example 2: Bioavailability Study

Ten dogs, divided into two groups comprising five animals each, were orally treated with a gel capsule containing either modification I or IV of Modoflaner at the same dosage of Modoflaner per kg body weight.

Modification I of Modoflaner could for example be obtained by suspending Modoflaner in toluene and stirring the obtained mixture for 14 days at room temperature. For kinetic evaluation, blood was sampled at predetermined time points (0, 0.5, 1, 2, 4, 6, 8, 24, 32, 48, 72 and 144 hours) before and after treatment (n=12 per dog). All samples were deep-frozen immediately after plasma preparation and stored at −18° C. or below until shipment to the analytical laboratory.

The samples were analyzed with regard to their concentration in Modoflaner.

The plasma samples were deproteinized by mixing 100 μL plasma with 900 μL of a mixture of 100 mL of 0.40 g ammonium acetate in 1 L water plus 100 μL formic acid and 600 mL acetonitrile, treatment for 30 s on a vortex mixer and subsequent centrifugation. The quantitative determination was performed by HPLC (Column ZORBAX Eclipse Plus C18 Rapid Resolution HD, 2.1×50 mm, 1.8 μm Agilent Technologies; Isocratic pump: Mobile phase: Solution of methanol/water (7+3, v/v)+10 mMol ammonium formate+ 0.12 mL/L formic acid Flow rate: 0.5 mL/min; Binary pump: Mobile phase A: water+10 mMol ammonium formate+0.12 mL/L formic acid Mobile phase B: methanol+10 mMol ammonium formate+0.12 mL/L formic acid Flow rate: 0.6 mL/min) with detection by tandem mass spectrometry using a Sciex API 5500 mass spectrometer (negative ionisation mode using the transition from Modoflaner precursor ion at m/z 714 to its product ion at m/z 694). The lower limit of quantitation was 1 μg/L.

Figure 2:
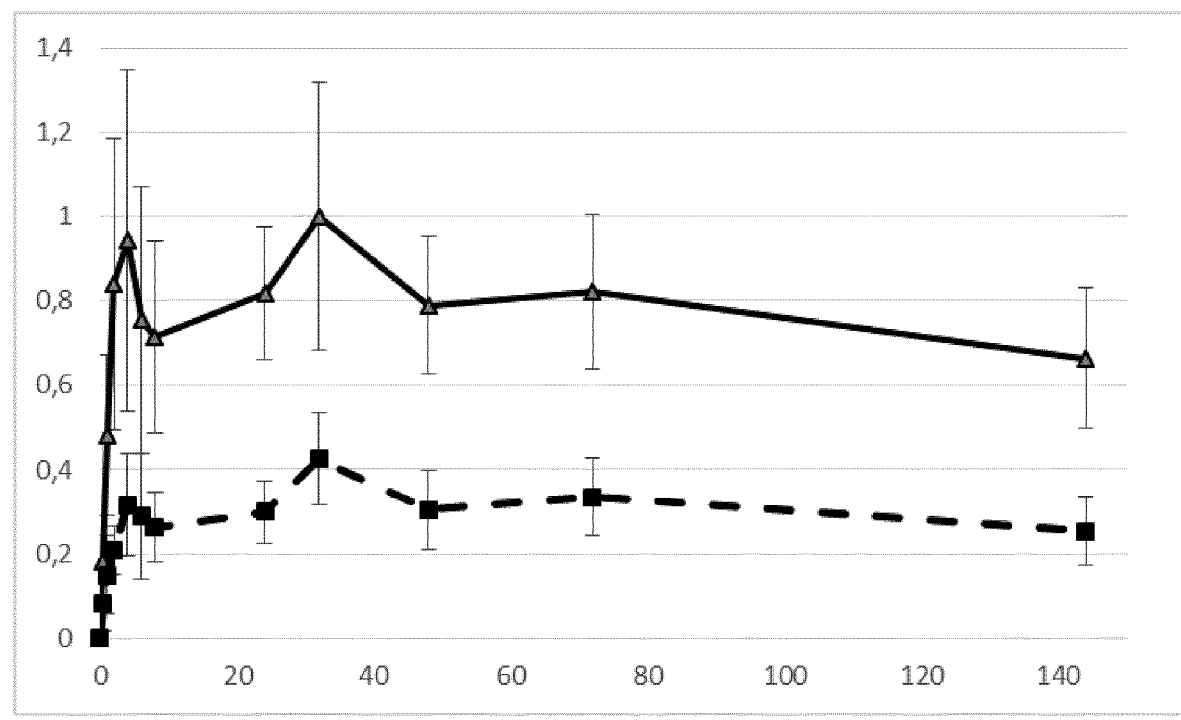
FIG. 2 shows the average Modoflaner plasma concentration in dogs (5 dogs per group) after administration of the same dosage per kg bodyweight of crystalline modification I of Modoflaner (dotted line with square points) or crystalline modification IV of Modoflaner (plain line with triangle points) by oral route (gelatin capsule) at predetermined time points (0, 0.5, 1, 2, 4, 6, 8, 24, 32, 48, 72 and 144 hours). The highest plasma concentration measured was set to 1 and the other plasma concentrations are given relatively to this highest value.

The results are given in FIG. 2. For calculation of the mean values, results below the limit of quantitation were set to half the limit of quantitation.

The dotted line (square points) represents the plasma concentration in Modoflaner after administration as crystalline modification I over time (in hours) and the full line the plasma concentration in Modoflaner after administration as crystalline modification IV over time (in hours)

When administered to dogs, crystalline modification IV of Modoflaner resulted in a Cmax of about 3 times the Cmax when crystalline modification I of Modoflaner was administered.

Similar differences are observed for Tmax (4 h for modification IV vs. 32 h for modification I) and AUC.

From these results, it can be concluded that crystalline modification IV of Modoflaner displays significantly pharmacokinetic properties than the most stable crystalline modification I of Modoflaner.

Example 3: Tablet Manufacture

Avicel PH-101 is microcrystalline cellulose commercially available from DuPont.

Texapon K12 is sodium dodecyl sulfate commercially available from BASF.

Aerosil is silica colloidal anhydrous commercially available from Evonik Industries AG.

PVP 25 is polyvinyl pyrrolidone 25 commercially available from BASF.

Ac-Di-Sol is croscarmellose sodium commercially available from DuPont.

Pork liver flavor is commercially available from American Laboratories Inc.

Magnesium stearate is commercially available from Peter Greven.

In a high-shear granulator, the following components as listed in Table 1 and about 500 mg of purified water are mixed at 200 rpm and granulated at 25° C. for 4 min at 50 rpm:

TABLE 1

Components in the first mixing and granulating steps:

| | Amount [mg] | Weight ratio [%] |
|---|---|---|
| 6-fluoro-N-(3-(2-iodo-4-(perfluoropropan-2-yl)-6-(trifluoromethyl)phenylcarbamoyl)-2-fluorophenyl)nicotinamide, modification IV | 450 | 45.00 |
| Avicel PH-101 | 366 | 36.60 |
| Texapon K12 | 12 | 1.20 |
| Aerosil | 10 | 1.00 |
| PVP 25 | 50 | 5.00 |
| Ac-Di-Sol | 112.1 | 11.21 |
| Total | 1000.1 | 100.00 |

The granulate obtained from the granulating step is dried to a residual moisture of <10%.

After that, the following components as listed in Table 2 are added to the granules, mixed and compressed into tablets:

TABLE 2

Components in the second mixing steps:

| | Amount [mg] | Weight ratio [%] |
|---|---|---|
| Pork liver flavor | 120.2 | 10.00 |
| Ac-Di-Sol | 69.70 | 5.80 |
| Magnesium stearate | 12 | 1.00 |
| Total | 1202.0 | |

The invention claimed is:

1. A crystalline form IV of 6-fluoro-N-(3-(2-iodo-4-(perfluoropropan-2-yl)-6-(trifluoromethyl)phenylcarbamoyl)-2-fluorophenyl) nicotinamide (modoflaner) of formula (I):

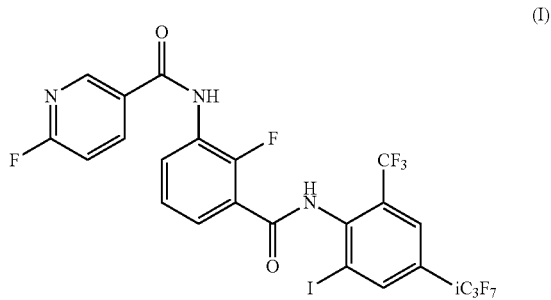

wherein the crystalline form IV of modoflaner displays in an X-ray powder diffractogram at 25° C. and Cu-Kα 1 radiation, at least the following reflections, quoted as 2θ value±0.2°: 11.6° 11.8°, 16.0° and 20.7°.

2. The crystalline form IV of modoflaner according to claim 1, wherein the crystalline form IV of modoflaner displays an X-ray powder diffractogram depicted in FIG. 1.

3. The crystalline form IV of modoflaner according to claim 1, wherein the crystalline form IV of modoflaner displays an endothermic event at about 184° C. and an additional endothermic event at about 211° C. by differential scanning calorimetry.

4. The crystalline form IV of modoflaner according to claim 1, wherein the crystalline form IV of modoflaner is obtained by recrystallization from ethyl acetate solution at ambient conditions, under cooling conditions or via precipitation with water.

5. The crystalline form IV of modoflaner according to claim 1, wherein the crystalline form IV of modoflaner displays in an X-ray powder diffractogram at 25° C. and Cu-Kα 1 radiation the following reflections, quoted as 2θ value±0.2°: 11.6° 11.8°, 12.6°, 14.1°, 14.3°, 16.0°, 19.6°, 20.7°, and 30.4°.

6. A tablet comprising:
the crystalline form IV of modoflaner according to claim 1
0.1 wt % to 5.0 wt % of a water absorption agent, and
0.5 wt % to 10.0 wt % of a binding agent,
wherein the tablet has a residual moisture of from 0.5 to 10.0% the amounts each based on the total weight amount of the tablet.

7. The tablet according to claim 6, wherein the crystalline form IV of modoflaner is present in the tablet in an amount of from 20.0 wt % to 60.0 wt % based on the total weight amount of the tablet.

8. The tablet according to claim 6, wherein the water absorption agent comprises a silicon dioxide selected from fumed silicon dioxide, lactose, starch and starch derivatives, bentonite, and mixtures thereof.

9. The tablet according to claim 6, wherein the binding agent is selected from polyvinylpyrrolidone, polyvinylpyrrolidone derivatives, cellulose derivatives such as methylcellulose, hydroxypropylcellulose or hydroxypropylmethylcellulose, starch derivatives, and mixtures thereof.

10. The tablet according to claim 6, further comprising from 20.0 to 50.0 wt % of a filler and from 5.0 wt % to 20.0 wt % of a flavoring agent.

11. The tablet according to claim 10, wherein the filler is selected from cellulose or derivatives, starch, sugars, sugar alcohols, inorganic fillers, and mixtures thereof.

12. The tablet according to claim 6, further comprising from 1.0 to 25.0 wt of additives selected from wetting agents, stabilizing agents, lubricants, glidants, and mixtures thereof.

13. The tablet according to claim 10, wherein the flavoring agent is selected from meat flavoring, flavor enhancers, and mixtures thereof.

14. A method for treating and/or prophylaxis of an ectoparasitic infestation in a companion animal, wherein the crystalline form IV of modoflaner according to claim 1 is administered to the companion animal.

15. A method for treating and/or prophylaxis of an ectoparasitic infestation in a companion animal, wherein the tablet according to claim 6 is administered to the companion animal.

16. The method according to claim 14 or 15, wherein the companion animal is a dog, a cat, or a ferret.

17. The method according to claim 14 or 15, wherein the ectoparasite is a flea or a tick.

* * * * *